Dec. 4, 1928.

F. X. KUHN 1,693,988

ICE CREAM PACKAGING MACHINE

Filed Dec. 10, 1926    3 Sheets-Sheet 1

Inventor:
Frederick X. Kuhn,
by Emery Booth Janney Varney
Attys.

Dec. 4, 1928.

F. X. KUHN

1,693,988

ICE CREAM PACKAGING MACHINE

Filed Dec. 10, 1926  3 Sheets-Sheet 2

Inventor:
Frederick X. Kuhn,

Dec. 4, 1928.

F. X. KUHN 1,693,988

ICE CREAM PACKAGING MACHINE

Filed Dec. 10, 1926    3 Sheets-Sheet 3

Inventor:
Frederick X. Kuhn,
by Emery Booth Janney Varney
Attys.

Patented Dec. 4, 1928.

1,693,988

UNITED STATES PATENT OFFICE.

FREDERICK X. KUHN, OF WALTHAM, MASSACHUSETTS, ASSIGNOR TO KUHN ICE CREAM MACHINERY CO., OF BOSTON, MASSACHUSETTS, A CORPORATION OF MASSACHUSETTS.

ICE-CREAM-PACKAGING MACHINE.

Application filed December 10, 1926. Serial No. 153,847.

This invention relates to methods of and apparatus for charging containers with material such as ice cream, and consists in improvements whereby this operation is improved, simplified and expedited. This application in part is a continuation of my prior co-pending application, Serial No. 654,147, filed July 27, 1923.

The invention will be best understood by reference to the following description when taken in connection wtih the accompaying illustration of one specific embodiment thereof, while its scope will be more particularly pointed out in the appended claims.

Referring to the drawings and to the embodiment of the invention, which is herein submitted for illustrative purposes only, the machine there shown is provided with a bed plate 11 resting on the supporting legs 13, there being provided an under bed or support 15 on which rests the driving mechanism for the machine. The bed plate 11 has the upright supports 17 on which is carried the supporting plate 19 for the charging, delivery and supply chambers, sufficient space being provided between the bed plate 11 and supporting plate 19 to permit the introduction beneath the charging chamber of a container to be charged.

Ice cream is introduced into the open top of the supply chamber 21 (Figs. 1 and 6) preferably in an approximately one-third frozen condition, under which it is in a fluid-plastic state, and the supply replenished from time to time as required. The supply chamber has a hopper-like formation with downwardly converging side walls and a downwardly converging rear wall. For the purpose of charging the container with ice cream of several different flavors it may be divided into several compartments of substantially equal capacity by means of the longitudinal partition walls 23, forming herein three compartments or sub-divisions, each of which is filled with ice cream of differing flavors. For a purpose to be later described, the lower part of the supply chamber is provided with a jacket 25 containing pipes 27 through which there may be circulated brine or other suitable cooling or freezing liquid, the pipes being externally protected by an insulating covering 29.

The supply chamber has bolted to the bottom thereof a casting which presents a delivery or forming chamber 31 communicating therewith, the delivery chamber being herein longitudinally separated into three compartments or sub-divisions by the partitions 33 which constitute extensions of the partitions 23 in the supply chamber, the bottom of each compartment of the supply chamber terminating in a rectangular opening which registers and communicates with the corresponding underlying compartment in the delivery chamber. The delivery chamber is also preferably surrounded by a jacket 35 containing pipes 37 through which the freezing mixture may be circulated, such pipes also being externally insulated by the covering 39.

In the operation of the machine, the ice cream contained in each compartment of the supply chamber is delivered to the corresponding underlying compartment in the delivery chamber, such delivery being assisted by means which exert pressure from behind the ice cream, serving to crowd or force it into the delivery chamber. Herein such means are provided for each compartment of the supply chamber in the form of a combined pushing and scraping device which is adapted at the proper point in the cycle of operation of the machine to descend and press the ice cream into the underlying compartment of the delivery chamber and at the same time to scrape or dislodge the growth of hard frozen particles which may form on the sides of the supply chamber or on the partition walls thereof.

Figures 6, 7, 8:
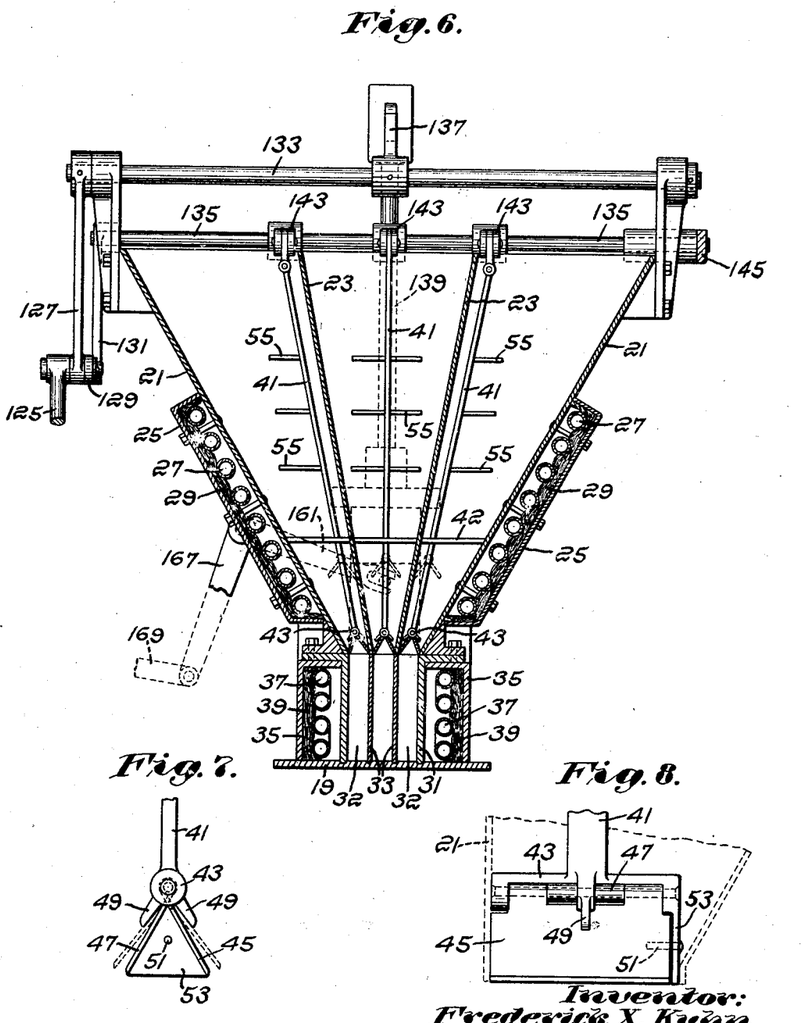
Fig. 6 is a sectional side elevation taken through the line 6—6 in Fig. 1 and showing the relation of the supply chamber to the delivery chamber.
Fig. 7 is a detail showing the construction of the scraping plungers or pushers.
Fig. 8 is a side elevation of one of the pushers showing its relation to the bottom of the charging chamber.

Referring to Figs. 6, 7 and 8, each pusher device is provided with a reciprocatory rod 41 passing through a guiding opening in a narrow transverse strip or guide plate 42 and having at its lower end the head or frame member 43 on which are hinged the two plates 45 and 47 arranged to spread or open as the pusher rod descends. The head 43 is provided with opposite angularly disposed stop lugs 49 which limit the opening or separation of the plates, while a certain amount of separation is enforced by means of the short pin 51 which extends between the hinged plates from a segmental plate 53 carried by the head 43 at the rear thereof or at that end adjacent the rear inclined wall of the supply chamber. As the pusher rods 41 are raised the hinged plates are elevated to the dotted line position shown in Fig. 6 and tend to close, passing through the surrounding mass of ice cream. When they descend they spread apart, being limited, however, in their opening movement by the lugs 49, and press or push the ice cream ahead of them, crowding it into the underlying compartment of the delivery chamber below. In the lowermost position the hinged plates come to rest with their edges at the top of the supply chamber compartments and, extending as they do for the full length of the rectangular passages opening from the supply chamber to the delivery chamber, in conjunction with the segmental plate 53 (see Fig. 8), they close such passages and prevent the return of the ice cream in the delivery chamber back into the supply chamber.

In their descending movement the edges of the hinged plates come in contact with the sides of the supply chamber and the partition walls thereof and remove therefrom the hard frozen particles of ice cream which may have gathered thereon, thereby keeping the passages clear both for the designed movement of the ice cream and for the movement of the working parts. The rods 41 are preferably provided with laterally extending fingers 55 which serve to agitate and stir the ice cream as they move therethrough.

Figure 2:
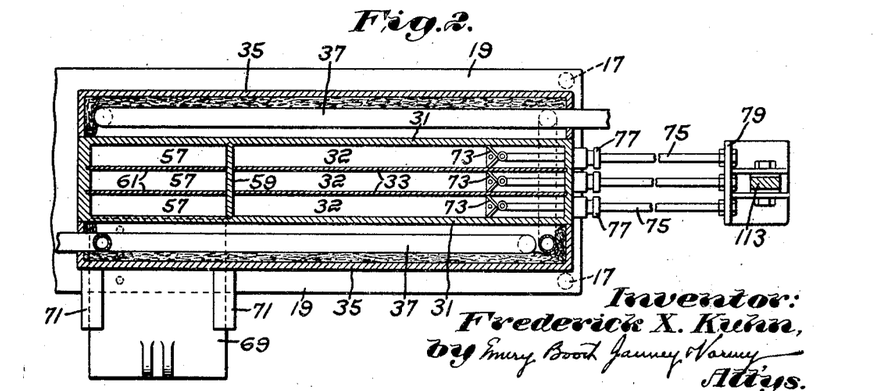
Fig. 2 is a sectional plan on an enlarged scale, taken on the line 2—2 in Fig. 1, showing the partitioned charging and delivery chambers.

Formed in the same casting 31 with the delivery chamber is a charging chamber 57 (see Figs. 2 and 3) to which the ice cream is delivered from the delivery chamber in the form of partly frozen charges and from which charging chamber it is in turn delivered to the container in the form of bricks or blocks of the size and shape intended to be vended. The charging chamber 57 constitutes an extension of the delivery chamber 31 being shut off therefrom at the proper times by the vertically-movable slide cut-off valve 59 (see Fig. 2). The charging chamber is also surrounded by the jacket 35 and cooling pipes 37 and is provided with partition walls 61 which align with the partition walls 33 in the delivery chamber.

The charging chamber (see Figs. 2 and 3) is rectangular in both transverse and elevational cross section, so that the charges of ice cream delivered to it have substantially the formation in which they are required to be placed in the cartons. The charging chamber is open at the bottom where its discharge mouth registers with an opening 63 in the plate 19 and contains a vertically slidable plunger 65 which is vertically slotted at 67 to sub-divide it into three parts adapted to reciprocate in the three compartments formed by the partitions 61 and forcibly expel the charges from the compartments at the proper times. The discharge opening in the bottom of the charging chamber is adapted to be opened and closed at the appropriate times by a slide or cut off valve 69 consisting of a plate (see Figs. 2 and 3) slidable in horizontal guides 71 and adapted to be reciprocated laterally in a slot or opening between the plate 19 and the walls of the casting 31 and jacket 37.

After the ice cream has been packed into the compartments of the delivery chamber by the action of the reciprocating pushing plates 45 and the latter have descended to close the passage between the said compartments and the supply chamber, the vertically slidable cut off valve 59, which has been in its closed position during the filling of the delivery chamber, is then raised and the charges of partly stiffened ice cream are expelled from the compartments of the delivery chamber 31 into the corresponding compartments of the charging chamber by the action of the horizontally moving plungers or pushers 73 (see Fig. 2) which are of substantially the same construction as the reciprocating pushers in the supply chamber. Each pair of hinged blades of the pushers 73, when the same are in open position, occupies the entire cross sectional area of one of the delivery chamber compartments. They are secured to horizontally reciprocating rods 75 which pass through stuffing box guides 77 in the back wall of the casting 31 and have their ends secured to a reciprocating cross head 79. When the delivery chamber is being filled they are each retracted behind the mouth of the passage connecting the two sets of compartments in the supply and the delivery chambers, but at the appropriate time are projected forwardly to a position beyond such passage and serve to force and pack a charge of ice cream into each compartment of the charging chamber. As they move forward, the hinged blades of the pushers 73 serve not only to force the ice cream ahead of them, but also act to clear the side walls and partitions of the delivery chamber of the accumulation of hard frozen particles of ice cream which might otherwise clog the passage and build up to interfere with the action of the moving parts.

Figures 3, 4, 5:
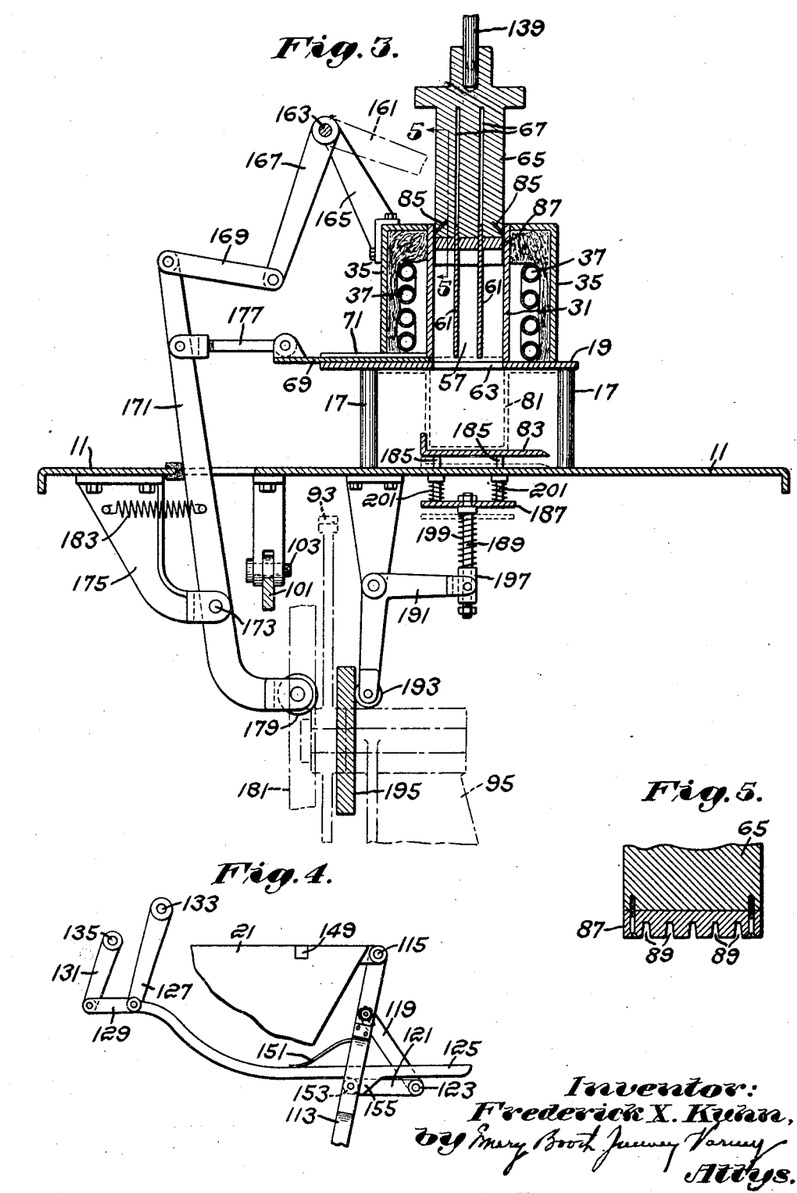
Fig. 3 is a sectional elevation on the line 3—3 showing the charging chamber and its relation to the container support, together with certain parts of the operating mechanism.
Fig. 4 is a detail showing certain of the actuating levers in a different position from that shown in Fig. 1.
Fig. 5 is a sectional detail, taken through the line 5—5 in Fig. 3, of the plunger for the charging chamber.

During the time that the ice cream is being forced into the charging chamber, the horizontal cut off valve 69 is positioned to close the bottom of the charging chamber and the plunger 65 is in the raised position, as shown in Fig. 3.

After the charging chamber has been filled as described, the vertically slidable cut off valve 59 is closed, while the horizontal cut off valve 69 is opened, and the expressing plunger 65 moves down in the charging chamber to expel the charges of ice cream contained therein through the underlying opening 63 and into a suitable container which meantime has been positioned beneath the same.

Figure 1:
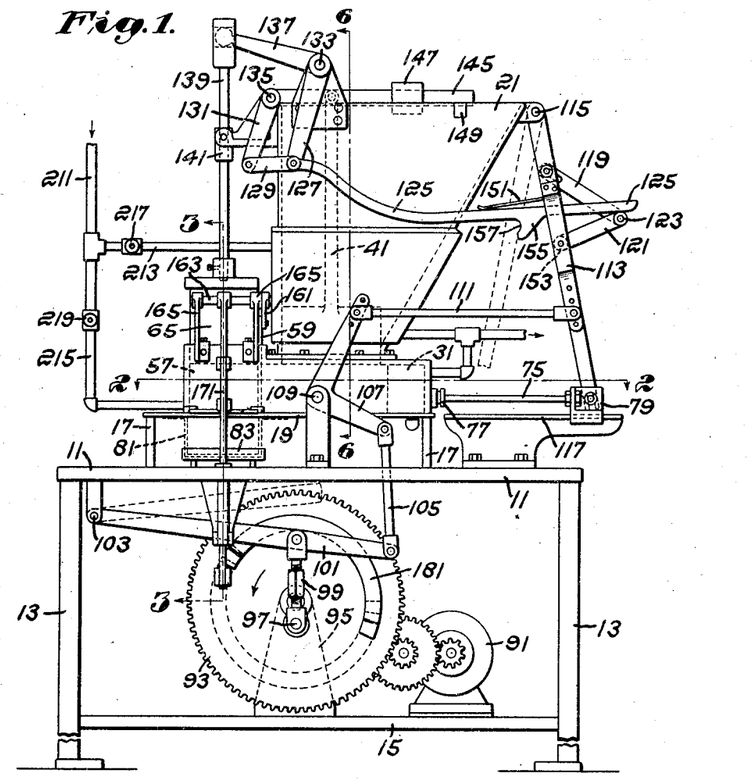
Fig. 1 is a side elevation showing the principal working parts of an ice cream charging machine embodying one form of the invention.

The container, which may be an ordinary pasteboard carton 81 (Fig. 3) carried, if desired, within a suitable metal form or cage, is carried by the container support 83 (see Figs. 1 and 3). While the charging chamber is being charged, the container 81 is manually placed on the container support and the latter raised by mechanism, to be hereinafter described, to bring the open mouth of the container in firm abutment against the bottom of the plate 19 and in registration with the discharge opening 63 so that it may be firmly held to receive the charges of ice cream which are thus expelled from the charging chamber under pressure of the plunger 65.

In order to keep the sides of the charging chamber clear of accumulated frost, suitable means are preferably provided, the same herein consisting of the scraper blades 85, one of which is carried by each opposite side of the plunger to engage with the chilled sides of the charging chamber, the plunger fitting the charging chamber with a slight clearance over which the scrapers extend. The latter are set at an acute angle so that in the downward movement of the plunger they engage with and clear the side walls of the chamber of any accumulated frost. Similar blades may be provided, if desired, at each of the four walls of the plunger and also to engage with the partition wall 61, but usually two of such clearing devices on the two opposite chilled side walls will suffice.

The specific form of charging machine herein illustrated is intended to charge the carton with three charges of ice cream of different flavors each in brick or block form, but, by rearranging the partition walls, the machine may be constructed to deliver a different number of flavors, or it may be constructed without such partition walls for the charging of a single flavor in the form of an undivided brick or block.

The machine is especially advantageous in charging cartons each with a plurality of separated individual portions, each to contain a proportionate part of the three or other number of flavors employed, the carton having been previously prepared with separating walls, as, for example, those presented by wax paper held therein by temporary stiffening partitions, such as described in the aforesaid application Serial No. 654,147, or my copending application Serial No. 163,382. In case individual portions are delivered to the cartons, prepared as there described, the bottom of the plunger 65 may be provided with an end plate 87 (see Figs. 3 and 5) which may be conveniently formed of rubber, such plate having a series of grooved recesses 89 extending in a direction transverse the underlying carton 81, which recesses are adapted to fit over the upstanding partition walls in case the latter project slightly above the top of the carton. Whether the grooved plate as described is employed for filling individual portions or the piston is provided with a plane ungrooved face for charging the carton with a single brick, the lower face of the plunger is proportioned so that its lower face, or the lower face of the plate 87, lies in substantially the plane of the top of the carton when the plunger is projected, thereby crowding the charge into the carbon to substantially fill the same.

Referring now to the mechanism operating the moving parts described, the former is driven by the motor 91 mounted on the bed plate 15 and connected through a suitable reducing gear to drive the large gear 93 journaled in the bracket 95. The gear 93 has eccentrically mounted thereon at 97 the link 99 connected to the lever 101 which is pivoted at 103 to the bed 11 of the machine and at the opposite end is jointed to the upright link 105. As the gear turns and the link 99 is raised and lowered the lever 101 oscillates, reciprocating the link 105 and also oscillating a bell crank lever 107 pivoted at 109 on the bed plate 11. The link 105 is pivoted to one arm of the bell crank, the opposite arm thereof being connected to the horizontal rod 111, the opposite end of the latter being connected to the depending oscillating lever 113 pivoted at 115 near the top of the supply chamber. The lower end of the lever 113 is connected to the cross head 79 by a slot and pin connection so that, as the lever 113 oscillates, the cross head 79 reciprocates on its guideways 117 and causes the forward and rearward movements of the pushers 73 within the compartments of the delivery chamber.

The oscillation of the lever 113 also controls the action of the delivery pushers 45 and the plunger 65. For this purpose there are bolted to the side of the lever arm 113 two short arms 119 and 121 which are united at their opposite ends to carry a roll 123, the latter engaging the under side of a rearwardly projecting link 125. The connection of the arm 119 to the lever 113 is adjustable so that its position may be altered to raise or lower the height of the roll 123. The link 125 is jointed at its opposite end to a lever arm 127 and also to a link 129 to which is connected a lever arm 131 (see Figs. 1 and 6). The lever arm 127 is connected to a rock shaft 133 which extends across the top of the supply chamber and the lever arm 131 is connected to the rock shaft 135 which also extends across the top of the supply chamber. The rock shaft 133 has a lever arm 137 extending forwardly over the top of the supply chamber and having a ball and socket connection to the top of a plunger rod 139 guided in the bracket 141 and secured at its lower end to the discharge plunger 65.

The rock shaft 135 carries three appropriately positioned laterally extending lever arms 143 connected respectively to the three pusher rods in the supply chamber (see Fig. 6) so that as the rock shaft is oscillated the pusher rods are raised or lowered. At its opposite end from the lever arm 131 the rock shaft 135 has secured thereto a long lever arm 145 which carries the weight 147, the downward movement of the weighted arm 145 being limited by a stop member 149.

When the oscillating lever 113 moves forwardly from the position represented in Fig. 1 to the position represented in Fig. 4, the link 125, which is pressed downwardly against the roll 123 by the spring 151, descends as the roll 123 drops, allowing a roll 153 mounted on the lever 113 to engage with a cam shaped formation 155 on the lower side of the link 125. As the movement continues and the roll 153 passes over the cam 155 the link drops down, causing the roll to engage with a groove 157 formed on the opposite side of the cam, so that, at the end of the forward swing of the lever 113, the parts occupy the position shown in Fig. 4. Accordingly, when the lever 113 begins its opposite movement, it carries with it the link 125 turning the rock shaft 135, raising the weight 147 and also the pusher rods 41 to the dotted line position shown in Fig. 6. It also turns the rock shaft 133 depressing the plunger rod 139 and the charging plunger 65. As the arm 113 approaches the end of its rearward movement the roll 123 rises against the end of the link 125, raising the latter and lifting the hook-shaped cam 155 free of the roller 153 which instantly releases the link 125 permitting the weight 147 to reverse the movement of the link and quickly lift the plunger 65 to its uppermost position (Fig. 3) and move the pusher rods 41 to their lowermost positions.

Accordingly, as the gear 93 turns (contraclockwise) from the position shown in Fig. 1, for substantially the first half revolution thereof the pushers 45 remain down, the charging plunger remains lifted, while the delivery plungers or pushers 73 execute their forward movement. During the next half revolution of the gear 93 the delivery plungers 73 reverse their movement and move backward, the pushers 45 rise slowly and the charging plunger slowly descends. At approximately the end of the complete revolution of the gear 93 the delivery plungers 73 have reached the end of their outward or rearward movement, the pushers 43 are released and execute a quick downward movement, while the charging plunger, having expelled the charge of ice cream into the container, is quickly raised under the action of the weight 147.

Referring now to the mechanism for controlling the two cut off valves, the vertically movable cut off valve 59 between the delivery chamber and the charging chamber is connected to an arm 161 (see Fig. 3) secured to a rock shaft 163 carried by the brackets 165 mounted on the jacket 37. The rock shaft 163 is turned by an arm 167 connected by the link 169 and the upright lever 171, the latter pivoted at 173 on a bracket 175 secured to the under side of the bed plate 11. The horizontally movable cut off valve 69 is also connected to the upright lever 171 by means of a link 177.

The lower end of the lever 171 carries a cam roll 179 which bears against a side cam carried by the face of the gear 93 and having the raised cam face 181 (see Fig. 1) extending for substantially 180° over the face of the gear. When the gear 93 turns (contraclockwise) from the position shown in Fig. 1, the cam face 181 engages the cam roll 179, turning the lever 171 clockwise (as viewed in Fig. 3), moving the slide valve 69 to its closed position and the vertically movable cut off valve 59 to its open position. After the gear has been turned through substantially half a revolution the cam roll 179 drops off the cam face and a spring 183 reverses the movement of the lever 179, this acting to move the valve 69 to its open position and the valve 59 to its closed position.

Accordingly, as the delivery plungers 73 start to move forward, the valve 59 is given a quick opening movement and the valve 69 a quick closing movement, the former remaining opened and the latter closed until the gear 93 is turned through substantially half a revolution, when the valve 59 moves quickly to a closed position and the valve 69 to an open position, this being timed to take place with the beginning of the downward movement of the charging plunger 65 and the outward movement of the delivery plungers 73, as well as the lifting movement of the pusher rods 41 in the supply chamber.

During that half of the cycle while the charging chamber is being filled, the container support 83 is in a lowered position (represented in dotted lines in Fig. 3), resting on the plate 11, and the operative is given opportunity to insert a container therein, the support automatically raising the container to present its mouth to the discharge opening of the charging chamber just previous to the time that the valve 69 opens and the plunger 65 begins to descend. To thus actuate the container support 83, the latter is mounted on four vertical pins 185 (Fig. 3) guided in the plate 11 and connected below the plate to a cross head 187 adapted to be raised and lowered by a rod 189 connected to the bell crank lever 191, the opposite arm of which carries a cam roll 193 adapted to engage with a cam rise 195 on the opposite side of the gear 93 to the cam rise 181. The cam rise 195 overlaps in its angular position the cam rise 181, so that the bell crank lever is moved to raise the container from the supporting position to receive the charge just before the cam roll 179 drops off from the cam rise 181 to open the valve 69 and close the valve 59. In order to exert a yielding pressure against the container support and press the mouth of the container firmly against the under side of the plate 19, the bell crank lever 191 is connected to a sleeve 197 slidably mounted on the rod 189 and acting against the cross head 187 through the spring 199. Springs 201 are mounted on the pins 185 between the bed plate 11 and the cross head 187 to positively drop the container support when the cam rise 195 passes out from under the cam roll 193.

In the operation of this machine, the supply chamber 21 is filled and its compartments replenished from time to time as may be required with the different flavors of ice cream selected for charging the container, such cream being introduced into the supply chamber preferably in a condition commonly termed one-third frozen, or that which is had by maintaining the cream at a temperature in the neighborhood of 26° F. In this condition it appears as a thick pasty, semi-fluid mass. As the cream passes down through the supply chamber it is subjected to the action of the cooling pipes 27 and becomes somewhat harder or stiffer, which condition becomes further intensified after it has been delivered into the delivery chamber, where it is subjected to the action of the cooling pipes 37 which act also on the cream after it has been delivered into the charging chamber.

The cooling liquid is brought to the machine through the supply pipe 211 and the branch pipes 213 and 215 for the cooling pipes 27 and 37 respectively, the valves 217 and 219 being provided so that the supply can be regulated to suit the conditions required.

The cooling or chilling action of these pipes is preferably so regulated that the cooling and hardening of the ice cream is progressive as it advances through the supply chamber and delivery chamber to the charging chamber, so that when delivered to the charging chamber it has reached a relatively stiff, formative and non-fluid state where it tends to retain the form imparted to it. This condition may be reached, for example, by so graduating the freezing action that the cream, before being discharged from the charging chamber into the container, is brought to what is known as a two-thirds frozen condition, or that reached by a freezing temperature in the neighborhood of 20° F., under which condition the moisture becomes stiff and non-fluid, holding the form imparted to it.

At each operative cycle of the machine, therefore, there is forced into the compartments of the delivery chamber from the relatively soft ice cream of the supply chamber compartments a charge of ice cream which gradually becomes stiffer and harder as it advances. The entrance from the supply chamber compartments is thereupon closed, the valve between the charging chamber and delivery chamber is raised and the several charges of relatively hardened ice cream, approaching the two-thirds frozen condition, are pressed or crowded by the pushers into the charging chamber, the delivery valve of which at that time is closed and the plunger raised, so that the charges are compressed into the several compartments of the charging chamber in substantially the form and shape in which they are to be delivered to the carton. The valve between the charging chamber and the delivery chamber thereupon closes, the delivery valve is opened and the plunger descends, forcing the cream, which by this time has reached the stiff and form-retaining state, into the underlying carton, the open mouth of which meantime has been pressed against the mouth of the charging chamber.

Accordingly, the cream when discharged from the charging chamber into the container is in such a hardened state that the cream from the several flavors cannot run together and intermingle in the container, but the different flavored bricks or blocks maintain a distinct line of separation or cleavage.

Where it is attempted to discharge unseparated layers of cream of different flavors into the same container, if the cream is in a soft, plastic, pasty or semi-frozen condition, represented, for example, by the one-third frozen condition, the soft cream from the adjoining layers tends to run together. Furthermore, when the charged container is subsequently placed in the hardening chamber to bring it to the full frozen condition, which may, for example, be represented by 0° F., or even by a lower temperature, the moisture contained in the soft cream works to the outer edges and crystalizes at the outside of the brick, lowering the quality of the cream and presenting a coarse, crystalized structure on the exterior instead of the smooth and finely grained texture which is desired. Filling the container with the soft cream also tends to bulge the carton after the hardening or final freezing action due to the expansion of the cream when subjected to the final freezing.

By charging the container as herein described with cream which has been brought to the hardened or two-thirds frozen condition, not only are the several blocks maintained in distinct and separate layers, but the tendency of the moisture to work to the sides of the brick is prevented, providing a cream of smoother and more desirable texture, and there is little or no tendency for subsequent expansion and bulging of the carton under the final hardening and freezing action.

In charging a container with the cream in a hardened or formative state, I find it desirable that the cream should be first forced into a closed forming chamber, as, for example, the one illustrated in the drawings, the compartment or compartments of which have substantially the shape and dimensions of blocks or units of the form in which the cream is to be delivered to the container. To expel the blocks or units of the hardened cream from such charging chamber I also find it preferable to employ a positive expressing device, such as the plunger 65, working in the charging chamber, so that the ice cream of each individual flavor, instead of being forced out as a shapeless mass, is formed within the chamber and delivered therefrom to the container in the shape and form it is to occupy therein. This, of course, is subject to the possibility of separating the brick within the container into individual portions, as heretofore described, where each individual portion receives a definite amount of each flavor.

It will also be observed that the ice cream in passing first from the supply chamber to the delivery chamber and from the delivery chamber to the charging chamber, and thence from the charging chamber to the container, is subjected to a succession of compressing or expressing actions, and that the accumulation of hardened frost crystals adjacent the sides of these various chambers, and which would otherwise interfere with the operation of the machine because of the progressive hardening action imposed on the cream, is kept cleared and reduced by the action of the scrapers described. Obviously other clearing means for maintaining the side walls of the various compartments free from such frost accumulation might be employed, but the scraping action offers a simple and practical expedient for this purpose.

While I have herein shown for the purposes of illustration one specific embodiment of the invention, it is to be understood that extensive deviations may be made from the form and relative arrangement of parts and that widely different applications may be made of the invention or individual features thereof, all without departing from the spirit of the invention.

I claim:

1. In a machine for charging a container with ice cream in hardened body form, the combination with a charging chamber having a plurality of compartments for different flavors, each of the size and shape of the body to be delivered to the container, of a delivery chamber having compartments corresponding to the compartments in the charging chamber and providing means for opening and closing communication between the delivery chamber and charging chamber, a supply chamber having compartments communicating with the compartments of the delivery chamber, means comprising pushing devices for forcing the cream from the supply chamber to the delivery chamber, means also comprising pushing devices for forcing the cream from the delivery chamber to the charging chamber, means for opening and closing the mouth of the charging chamber, means for forcing the formed bodies of ice cream in the charging chamber from the latter into the container, the same comprising an expressing device movable in the charging chamber to expel the formed bodies of ice cream, means for progressively hardening the ice cream as it advances through said several chambers, and means for maintaining the walls of said chambers clear of the accumulations of hardened ice cream, the same comprising scraping devices associated with said pushing and expressing means.

2. In a machine for charging a container with ice cream in a relatively stiff, form-retaining condition, the combination with a charging chamber having a plurality of compartments for different flavors each of the size and shape of the body to be delivered to the container, of a delivery chamber communicating therewith and having a plurality of compartments corresponding to the compartments of the charging chamber, means for delivering ice cream from the delivery chamber to the charging chamber, means for cutting off the supply, and means to expel the formed bodies of cream into the container, the same comprising expressing devices movable in each compartment of the charging chamber.

3. In a machine for charging a container with ice cream in a relatively stiff, form-retaining condition, the combination with a charging chamber of the size and shape of the body to be delivered to the container, of means for delivering the ice cream into said chamber to form the same therein, means for cutting off the delivery, an expressing device movable in the charging chamber to expel the formed body of ice cream into the container and means for lowering the temperature of the ice cream in the machine to cause the same to leave the machine in a relatively stiff condition.

4. In a machine for charging a container with ice cream in a relatively stiff, form-retaining condition, the combination with a charging chamber of the size and shape of the body to be delivered to the container, of means for delivering the ice cream into said chamber to form the same therein, means for cutting off the delivery, means to expel the formed body of ice cream into the container, and means for lowering the temperature of the ice cream as it advances through the machine to cause the same to leave the charging chamber in a relatively stiff condition.

5. In a machine for charging a container with ice cream in a relatively stiff, form-retaining condition, the combination with a charging chamber of the size and shape of the body to be delivered to the container, of an expressing device to express the ice cream from the charging chamber, a delivery chamber, means to push the ice cream from the delivery chamber into the charging chamber and means to harden the ice cream in its passage through the machine.

6. In a machine for delivering successive charges of ice cream, the combination with a charging chamber of the size and shape of the body of ice cream to be delivered, said chamber having a discharge opening, of a chamber communicating therewith, means for forcing ice cream therefrom into the charging chamber, a reciprocatory plunger, a reciprocatory expressing device for discharging the ice cream from said charging chamber through said discharge opening, and means for maintaining the walls of the charging chamber clear of accumulations of hardened ice cream, the same comprising scraping devices carried by the said plunger.

7. In a machine for delivering successive charges of ice cream, the combination with a charging chamber of the size and shape of the body of ice cream to be delivered, said chamber having a discharge opening, of a chamber communicating therewith, means for forcing ice cream therefrom into the charging chamber, a reciprocatory plunger, a reciprocatory expressing device for discharging the ice cream from said charging chamber through said discharge opening, and means for maintaining the walls of the charging chamber clear of accumulations of hardened ice cream.

8. In a machine for charging a container with a plurality of block-like bodies of ice cream in a relatively stiff, form-retaining condition, the combination with a charging chamber having a plurality of compartments of the size and shape of the bodies to be delivered to the container, of means for charging the compartments with ice cream, and a reciprocatory plunger movable in each compartment to express the ice cream therefrom.

9. In a machine for charging a container with ice cream in a relatively stiff and hardened form, the combination with a source of supply adapted to receive the ice cream in a relatively soft condition, of means to deliver to the container successive charges of ice cream from said source, means for maintaining a relatively low temperature about the ice cream while in the machine, and means to maintain the walls of the machine free from accumulations of hardened ice cream, the same comprising movable scraping devices engaging said walls.

10. In a machine for charging a container with ice cream in a relatively stiff and hardened form, the combination with a source of supply adapted to receive the ice cream in a relatively soft condition, of means to deliver to the container successive charges of ice cream from said source, means for maintaining a relatively low temperature about the ice cream while in the machine, and means to maintain the walls of the machine free from accumulations of hardened ice cream.

11. In a machine for charging a container with ice cream in a relatively stiff and hardened form, the combination with a source of supply, of means for delivering to the container successive charges of ice cream from said source, means for maintaining a relatively low temperature about the ice cream while in the machine, and pusher devices to advance the ice cream having means for clearing the walls of the accumulations of hardened ice cream.

12. In a machine for delivering charges of ice cream, the combination with a source of supply, of means for delivering successive charges from said supply source, and means for advancing the ice cream through the machine comprising a reciprocatory device having hinged plates adapted to spread apart when forced against the ice cream, said plates engaging the walls of the machine to free the same from accumulations of hardened ice cream.

13. The method of charging a container with ice cream which consists in maintaining a supply of ice cream in a relatively soft condition, separating from said supply successive charges, delivering each charge to a space having the form and shape of the body to be delivered to the container, subjecting the successive charges to a temperature qualified to stiffen or harden the ice cream, and delivering the relatively hard and formed body of ice cream to the container.

14. In a machine for charging a container with ice cream in a relatively stiff, form-retaining condition, the combination with a charging chamber having a plurality of compartments for different flavors each of the size and shape of the body to be delivered to the container, of a delivery chamber, means for delivering the ice cream from the delivery chamber to the compartments of said charging chamber, means for closing the charging chamber to the delivery chamber after the delivery of said ice cream, and an expressing device movable in each compartment of the charging chamber to expel the formed body of ice cream into the container.

15. In a machine for charging a container with ice cream in a relatively stiff, form-retaining condition, the combination with a charging chamber having a plurality of compartments for different flavors each of the size and shape of the body to be delivered to the container, of a delivery chamber means for delivering the ice cream from the delivery chamber to the compartments of said charging chamber to form the same therein, means for closing the charging chamber to the delivery chamber after the delivery of said ice cream, and means to expel the formed body of ice cream into the container.

16. In a machine for charging a container with ice cream, the combination with a charging chamber of the size and shape of the body to be delivered to the container, of a delivery chamber with means for opening and closing communication between the charging chamber and delivery chamber, a supply chamber communicating with the delivery chamber, means in the delivery chamber movable towards and away from the charging chamber for forcing ice cream from the former into the latter, means timed to function in the retracted position of said forcing means to force ice cream from the supply chamber into the delivery chamber, means for opening and closing the mouth of the charging chamber, and means for forcing the formed bodies of ice cream in the charging chamber into the container.

17. In a machine for charging a container with ice cream, the combination with a charging chamber of the size and shape of the body to be delivered to the container, of a delivery chamber with means for opening and closing communication between the charging chamber and delivery chamber, a supply chamber communicating with the delivery chamber, means in the delivery chamber movable towards and away from the charging chamber for forcing ice cream from the former into the latter, means timed to function in the retracted position of said forcing means to force ice cream from the supply chamber into the delivery chamber, means for opening and closing the mouth of the charging chamber, and means for forcing the formed bodies of ice cream in the charging chamber into the container, the same comprising a reciprocatory expressing device movable in the charging chamber.

18. In a machine for charging a container with ice cream in a relatively stiff, form-retaining condition, the combination with a charging chamber of the size and shape of the body to be delivered to the container, of means for forcing ice cream into the charging chamber, means for maintaining a relatively low temperature about the ice cream while in the machine, and devices movable within the machine to maintain the walls thereof free from accumulations of hardened ice cream.

In testimony whereof, I have signed my name to this specification.

FREDERICK X. KUHN.